(12) United States Patent
Liu

(10) Patent No.: US 9,682,447 B2
(45) Date of Patent: Jun. 20, 2017

(54) ORGANIC ACID- OR LATENT ORGANIC ACID-FUNCTIONALIZED POLYMER-COATED METAL POWDERS FOR SOLDER PASTES

(75) Inventor: Puwei Liu, San Marcos, CA (US)

(73) Assignee: Henkel IP & Holding GmbH, Duesseldorf (DE)

( * ) Notice: Subject to any disclaimer, the term of this patent is extended or adjusted under 35 U.S.C. 154(b) by 309 days.

(21) Appl. No.: 12/860,497

(22) Filed: Aug. 20, 2010

(65) Prior Publication Data

US 2012/0042990 A1    Feb. 23, 2012

(51) Int. Cl.
| B23K 35/36 | (2006.01) |
| B23K 35/26 | (2006.01) |
| B23K 35/30 | (2006.01) |
| B23K 35/365 | (2006.01) |

(52) U.S. Cl.
CPC ........ B23K 35/3601 (2013.01); B23K 35/262 (2013.01); B23K 35/302 (2013.01); B23K 35/3006 (2013.01); B23K 35/365 (2013.01); B23K 35/3613 (2013.01); *Y10T 428/2998* (2015.01)

(58) Field of Classification Search
CPC ....... H01L 2924/014; H01L 2924/0132; H01L 2924/0105; B23K 35/3601; B23K 35/262
USPC ............................. 148/23; 257/789
See application file for complete search history.

(56) References Cited

U.S. PATENT DOCUMENTS

| 4,452,861 A | 6/1984 | Okamoto et al. |
| 4,607,091 A | 8/1986 | Schreiber |
| 4,994,326 A | 2/1991 | Shimmura et al. |
| 5,021,484 A | 6/1991 | Schreiber et al. |
| 5,062,896 A | 11/1991 | Huang et al. |
| 5,180,752 A | 1/1993 | Melber et al. |
| 5,200,452 A | 4/1993 | Schreiber |
| 5,281,388 A | 1/1994 | Palmer et al. |
| 5,290,825 A | 3/1994 | Lazar |
| 5,315,462 A | 5/1994 | Ohkubo et al. |
| 5,328,522 A * | 7/1994 | Sowa et al. ............... 148/23 |
| 5,369,192 A | 11/1994 | Ko et al. |
| 5,397,611 A | 3/1995 | Wong |
| 5,439,635 A | 8/1995 | Seemann |
| 5,445,911 A | 8/1995 | Russell et al. |
| 5,480,603 A | 1/1996 | Lopez et al. |
| 5,567,499 A | 10/1996 | Cundiff et al. |
| 5,580,656 A | 12/1996 | Melber |
| 5,677,048 A | 10/1997 | Pushaw |

(Continued)

FOREIGN PATENT DOCUMENTS

| JP | 2000141084 A | 5/2000 |
| JP | 2000317682 | 11/2000 |

(Continued)

OTHER PUBLICATIONS

International Search Report for International Patent Application No. PCT/US09/065296 mailed on Jul. 1, 2010.

(Continued)

*Primary Examiner* — Weiping Zhu
(74) *Attorney, Agent, or Firm* — Steven C. Bauman

(57) ABSTRACT

The present invention relates to organic acid- or latent organic acid-functionalized polymer-coated metal powders, such as metal powders used as appropriate in the formation of solder alloys, spheres and pastes.

9 Claims, 3 Drawing Sheets

(56) References Cited

U.S. PATENT DOCUMENTS

| | | |
|---|---|---|
| 5,736,074 A | 4/1998 | Hayes et al. |
| 5,830,389 A | 11/1998 | Capote et al. |
| 5,851,311 A | 12/1998 | Diamant et al. |
| 5,851,336 A | 12/1998 | Cundiff et al. |
| 5,902,535 A | 5/1999 | Burgess et al. |
| 6,077,380 A | 6/2000 | Hayes et al. |
| 6,156,146 A | 12/2000 | Cundiff |
| 6,207,786 B1 | 3/2001 | Ishida et al. |
| 6,294,629 B1 | 9/2001 | O'Dwyer et al. |
| 6,416,590 B1 | 7/2002 | Hirata et al. |
| 6,416,863 B1 | 7/2002 | Schulze et al. |
| 6,475,331 B1 | 11/2002 | O'Connor et al. |
| 7,368,167 B2 | 5/2008 | Johnston |
| 2005/0171273 A1 | 8/2005 | Ledwidge et al. |
| 2007/0007692 A1 | 1/2007 | Lehmann et al. |
| 2010/0193973 A1* | 8/2010 | Chae ............................ 257/789 |

FOREIGN PATENT DOCUMENTS

| | | |
|---|---|---|
| JP | 2005066672 A | 3/2005 |
| JP | 2009030111 A | 2/2009 |
| JP | 2009269935 A | 11/2009 |
| JP | 2010053385 A | 3/2010 |
| JP | 2010150653 A | 7/2010 |
| JP | 2010153118 A | 7/2010 |
| WO | WO 01/85861 | 11/2001 |
| WO | 2010/059924 | 5/2010 |
| WO | 2010059924 A2 | 5/2010 |

OTHER PUBLICATIONS

S. Rimdusit and H. Ishida, "Development of new class of electronic packaging materials based on ternary system of benzoxazine, epoxy, and phenolic resin," *Polymer*, 41, 7941-49 (2000).

\* cited by examiner

ORGANIC ACID- OR LATENT ORGANIC ACID-FUNCTIONALIZED POLYMER-COATED METAL POWDERS FOR SOLDER PASTES

BACKGROUND

Field

The present invention relates to organic acid- or latent organic acid-functionalized polymer-coated metal powders, such as metal powders used as appropriate in the formation of solder alloys, spheres and pastes. The metal powders are coated with an organic acid or latent organic acid.

Brief Description of Related Technology

Solder is widely used in the assembly of semiconductor packages and semiconductor devices.

For instance, solder balls or spheres are used in the assembly of semiconductor packages, such as in flip chip applications. It is known to place a stearic acid coating on the surface of such solder balls or spheres.

Solder paste is commonly used for surface-mounted soldering of electrical components to circuit boards. Solder paste is useful because it can be applied to selected areas of the circuit board with its tackiness characteristic providing the capability of holding the electrical components in position without additional adhesives before forming the permanent bonds as the board passes through the solder reflow process.

Solder paste typically comprises a solder powder, a resinous component such as rosin, activators such as organic acids or amines, rheological control agents, thickeners and solvents. The solder paste is typically coated on the circuit board by techniques such as screen printing, dispensing, and transfer printing. Thereafter, the electrical components are placed on the circuit board and the solder paste is reflowed, by which the solder is heated sufficiently to cause it to melt and thereafter is cooling the solder sufficiently to cause it to solidify.

One problem in the industry associated with the use of solder paste is that it often has a short and unpredictable shelf life, e.g., typically from about one month to six months. The unpredictability in shelf life is caused, at least in part, by variations in the lag time from when the solder powder is made to the time it is mixed with flux to form solder paste, thereby resulting in variations in the degree of oxidation on the solder powder. Such oxidized powder does not reflow as well as unoxidized powder. Further, when the solder powder is combined with flux, which is inherently corrosive, the solder powder often reacts with the flux, thereby oxidizing the powder and reducing the acidity, thus effectiveness, of the flux. As a result, the performance of the solder paste often deteriorates over time. Moreover, the reaction between the solder powder and the flux typically causes the viscosity of the solder paste to increase substantially, which can make printing the solder paste difficult if not impossible depending on pitch.

Attempts have been made to reduce the reaction rate between the solder powder and the flux and thereby increase the shelf life of the solder paste, by storing the solder paste under refrigeration conditions. However, refrigeration is not effective to compensate for the varying degrees of oxidation on the solder powder prior to its incorporation into the solder paste.

It has also been reported that solder powder has been coated with materials that are non-reactive with the solder paste. For example, U.S. Pat. No. 4,994,326 discloses that coating agents that are insoluble or hardly soluble in a vehicle for solder pastes including those based on silicone and fluorine such as, for instance, silicone oils, silicone base high-molecular compounds, fluorinated silicone oils, fluorosilicone resins and fluorinated hydrocarbon base high-molecular compounds, are used as coatings.

The '326 patent also discloses a relatively large amount of coating material which is applied to the solder powder. While the relatively large amount of coating material may be effective to inhibit oxidation of the solder powder, in general, large amounts of coating material are undesirable since they can create a barrier which can inhibit the reflow of the solder. Moreover, such large amounts of coating material may cause physical obstructions and/or impurities which result in poor reflow characteristics, such as inadequate substrate wetting by the flux which can cause poor spreading of the solder and a discontinuous solder connection.

In addition, the '326 patent discloses the use of fluorinated hydrocarbons which are used as solvents in coating the solder powder. Currently, fluorinated hydrocarbons are considered to be an environmental pollutant and the use thereof is generally undesirable.

U.S. Pat. No. 6,416,863 is directed to and claims a method of encapsulating solder metal powder in which the powder is provided with a thin polymer protective layer by a polymerization reaction running on the surface of the solder powder, with the following steps:

a) producing a suspension of powder and a hydrophobic liquid, b) generating a hydrophobic surface layer on each metal particle by adding a cationic tenside with a chain length of $C_1$ through $C_{20}$ with continuous stirring to form a brush structure on the hydrophobic layer of step (a), c) stirring the mixture of steps a) and b) until formation of a viscous homogeneous mass, d) adding a radically polymerizable monomer to the mass of step c) and which forms a thermoplastic polymer with a glass temperature Tg of at least 60° C. below the solidus temperature of the solder powder, e) adding an organic initiator to start an interfacial polymerization reaction with incorporation of the hydrophobic layer of step b) and formation of a protective layer of thermoplastic polymer which has fluxing agent characteristics, f) introducing the mass of step e) into an aqueous preparation with continuous stirring, whereby the preparation contains an emulsifier for suspension stabilization and controlling the polymerization reaction by tempering to 50° C. to 90° C. and maintaining this temperature for at least 120 min, and g) cooling, washing and recovering the encapsulated solder powder of steps e) and f). Suitable monomers for forming the encapsulating wall are reported to be radically polymerizable monomers, preferably methacrylic-2-hydroxyethylester or methylmethacrylate.

U.S. Pat. No. 5,328,522 is directed to and claims a solder paste comprising (i) a flux and (ii) a coated solder powder comprising solder particles coated with parylene (having a melting point lower than the solder particles) in an amount from about 0.001 to about 0.5 weight percent based on the total weight of the coated solder powder and effective to inhibit oxidation of the solder particles in the solder paste without substantially inhibiting reflow characteristics of the coated solder powder.

U.S. Pat. No. 4,452,861 (Okamoto) describes solid particles encapsulated with cyanoacrylate polymer. The particles are encapsulated to prevent degradation due to reactive or corrosive surroundings. The cyanoacrylate polymer is used to coat phosphor particles and the like which are employed as coatings in cathode ray tubes and the like. Cerium activated calcium sulphide phosphor powder is the exemplified material which is coated.

U.S. Patent Application Publication No. 2005/0171273 describes a curable composition for forming anisotropically conductive bonds comprising:
(i) an amount of a first substantially uncured curable component; and
(ii) conductive particles coated with the cured product of a second curable component, where the coated-conductive particles are dispersed within the first curable component.

International Patent Publication No. WO 2010/059924 is directed to a metal particle having a thermally decomposable polymer coated on at least a portion of a surface thereof, where the thermally decomposable polymer has a ceiling temperature below a degradation temperature of the thermally decomposable polymer and below a melting point of the metal particles. Examples of the thermally decomposable polymer are disclosed as a cyanoacrylate polymer or a dicyclopentadiene polymer.

Notwithstanding the state-of-the-technology, it would be desirable to provide an organic acid or latent organic acid as a coating on metal particles particularly those suitable for use in solder pastes.

SUMMARY

The present invention thus provides a metal powder having one or more hydroxyl groups on the surface thereof that are available for reaction with polymeric materials have organic acid or latent organic acid functional groups to form either organic acid or latent organic acid coatings on at least a portion of a surface thereof, where the coated metal powder is particularly suitable for use in solder pastes. The hydroxyl groups on the surface of the metal powder are capable of reacting with acid or latent organic acid to form an ester or a half ester, respectively, the reacted products of which tends to degrade under elevated temperature conditions.

DETAILED DESCRIPTION

As noted above, the present invention provides a metal powder having an organic acid or latent organic acid coating on at least a portion of a surface thereof, where the coated metal powder is particularly suitable for use in solder pastes.

The organic acid or latent organic acid functionalized polymer for use as the coating has as its chief function the task of physically isolating the metal particles from environmental degradation, such as oxidation and chemical reaction with flux media. In general the organic acid or latent organic acid coating acts as a physical barrier toward oxidation while the metal powder and/or solder paste in which the coated metal particle is being stored for use.

In one embodiment the organic acid or latent organic acid functionalized polymer for use as the coating are the copolymers of olefins and maleic anhydride are examples of latent organic acids suitable for use as a solder coating. Polyalkylenes, such as polyethylene, polypropylene, or polybutylene, onto the backbone of which has been grafted maleic anhydride groups are particularly attractive for use in the present invention. More specifically, such polyalkylenes include RICON branded materials (commercially available from Sartomer) which are polybutadiene grafted with different percentages of maleic anhydride, such as RICON 130MA20, RICON 131MA8, and RICON 131MA15; PEMA materials (commercially available from Aldrich), which are polyethylene grafted with different percentages of maleic anhydride, such as 0.5% of maleic anhydride; dimer acids; stearic acid; adipic acid; and 12-hydroxystearic acid.

Figure 1:
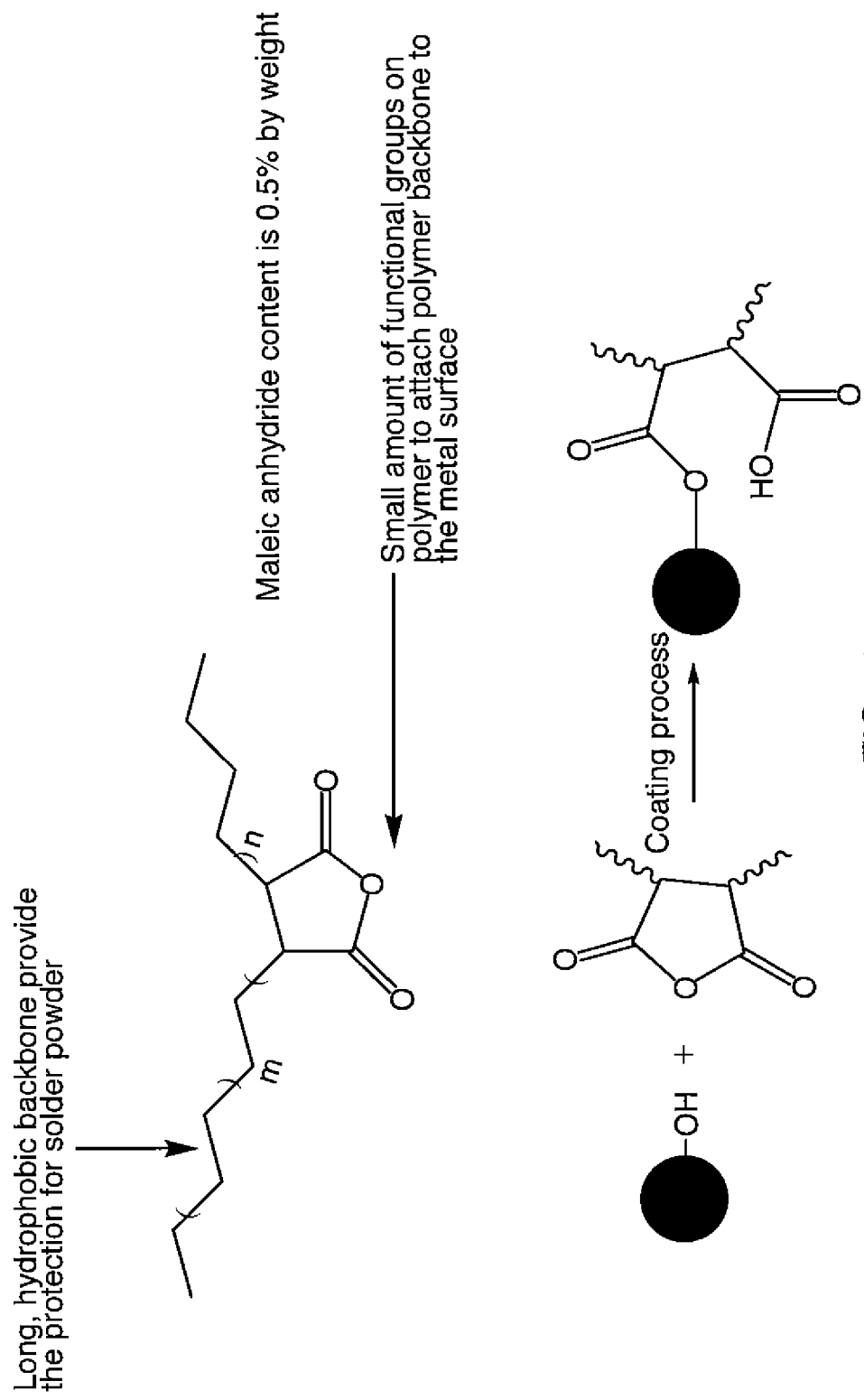
FIG. 1 depicts a synthetic scheme to form a polybutadiene/maleic anhydride adduct.
Figure 2:
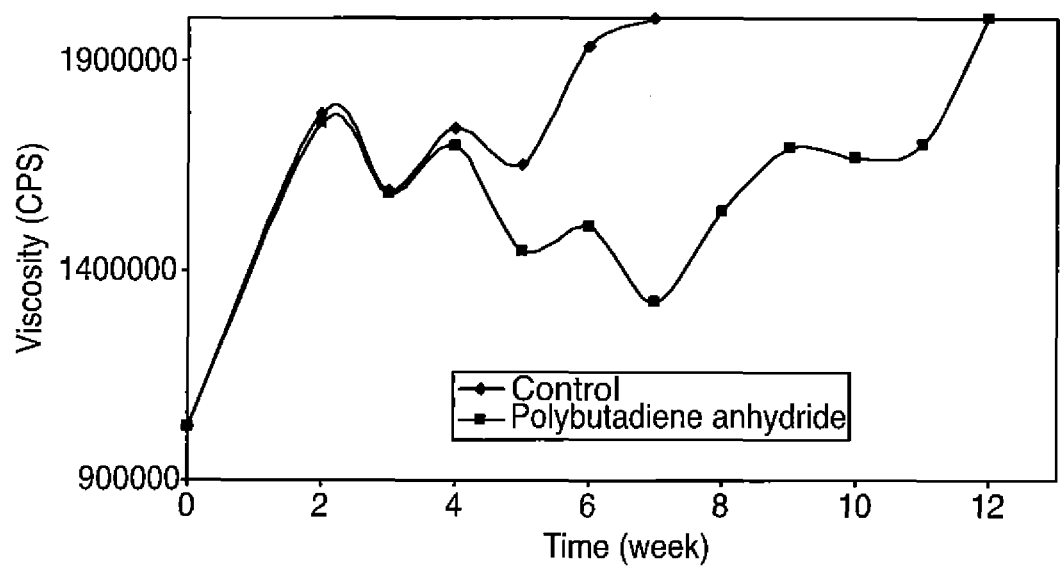
FIG. 2 depicts a viscosity versus time plot, illustrating the lower viscosity build up in a solder paste of latent organic acid-coated solder powder as compared with a central.
Figure 3:
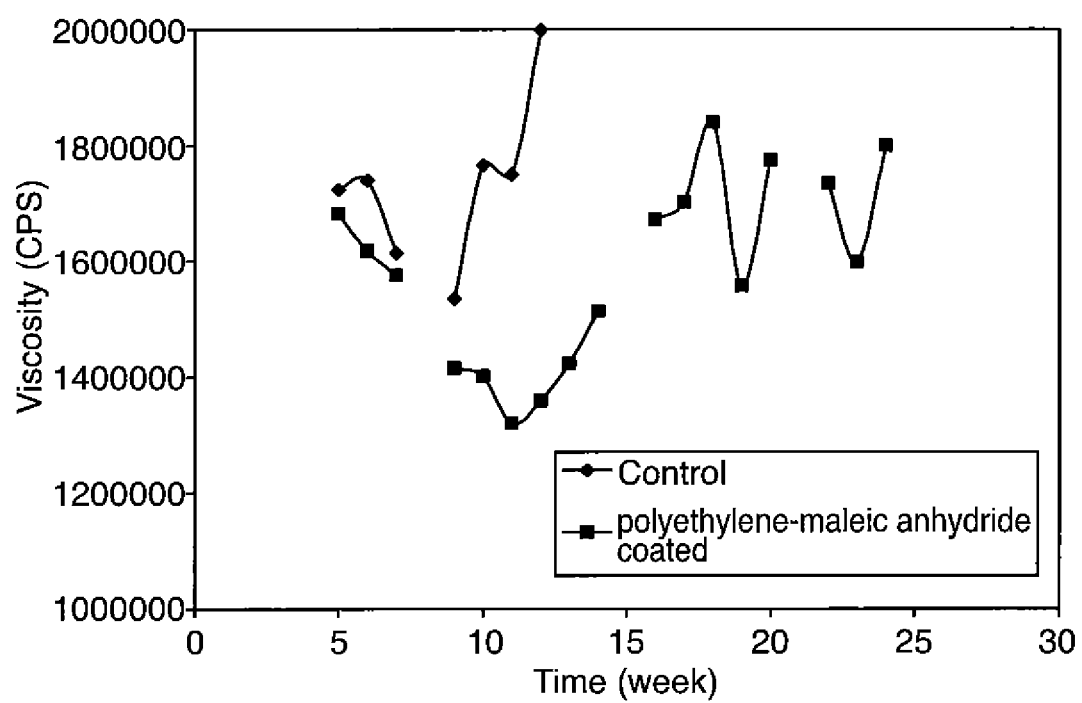
FIG. 3 depicts the manner in which the organic acid or latent organic acid coats a portion of the surface of the metal powder.

In addition, reference to FIG. 1 shows a polybutadiene maleic anhydride adduct synthesis. Copolymers such as this adduct tend to be the hydrophobic in nature. Increases in hydrophobicity show improved resistance to environmental influences, such as when the flux is formulated or under ambient conditions when stored prior to use.

In certain applications the metal particles will be placed between two substrates, for example between two conductive substrates such as in a semiconductor package application, so that the particle must be sufficiently uncoated to form a conductive pathway between the substrates it bridges. In such circumstances the bringing together of the substrates may be sufficient to "flatten" (deform by pressing upon) the metal particle and break the coating sufficiently.

The metal particles may be mono-sized, i.e., substantially of the same dimensions. This may be important if the bond gap formed is a semiconductor package or assembly, for instance is desirably of a particular size. However, particles of varying dimensions can be used, so as to have a relatively wide distribution of diameters about a mean value such as from about 0.5 to about 100 µm in at least one dimension, desirably about 3 to about 50 µm. In particular, it is desirable that the coated particles are spherical in shape.

Desirably the coating on the particles is less than about 3 µm, more particularly in the range from about 0.001 to about 0.2 µm, such as from 0.004 to about 0.4 µm, for example from about 0.01 to about 0.1 µm. The coating on the particles can also be determined as a function of weight gain on the particles after the coating process.

The polymer with organic acid or latent organic acid coated on the metal particles lends to the stability of the metal particles, and of formulations in which the coated metal particles are used, by mitigating against the reactivity of the particles towards environmental contaminates or in the case of a formulation, such as solder paste, other components that are used to form the formulation.

In the context of a solder reflow process, after application of the solder paste, the polymer coating of at least some of the metal particles is at least partially removed by exposure to the elevated temperatures reached during reflow so as to expose the surface of the metal particle, i.e., here, the solder powder. The polymer coating may also be at least partially removed by physical breaking (for example by applying sufficient pressure to the particle to deform it to cause breaking of the coating).

The polymer with organic acid or latent organic acid coated metal particles can be employed in many applications. One of the main end uses will be in the electronics industry generally and in particular in solder paste, such as is in flip-chip applications, and solder sphere application.

The polymer with organic acid or latent organic acid coated metal particles and formulations, such as solder pastes, which are made therewith, and solder spheres are particularly useful for establishing electrical interconnections between semiconductor chips and substrates.

Any type/shape of the metal particle may be used. In particular the particles may be spherical or tending toward spherical. Suitable metals for the metal particle include elemental metal such as tin, silver, copper, lead, zinc, indium, bismuth, and rare earth metals or alloys such as tin/silver/copper, tin/zinc, tin/bismuth, tin/lead and tin/indium/bismuth alloys.

The invention also relates to a method of forming a polymer coating on a metal particle which includes the steps of:
a) providing a plurality of metal particles;
b) applying to the plurality of metal particles a polymer having an organic acid or latent organic acid functional group under suitable conditions so as to substantially coat at least a portion of the surface of most of the metal particles; and
c) exposing the organic acid- or latent organic acid-functionalized polymer coating on the surface of the metal particles to suitable conditions to form an acetal or hemi-acetal linkage between the organic acid- or latent organic acid-functionalized polymer and the surface of the metal particle.

The invention also relates to a method of forming solder paste which includes the steps of:
a) providing a polymer having organic acid or latent organic acid functional groups as a coating on at least a portion on the surface of solder powder;
b) providing two or more of solder paste components selected from rosin, activators, rheological control agents, thickeners, or solvents; and
c) blending the organic acid-or latent organic acid-functionalized polymer coated solder powder with the solder paste components to form a solder paste.

Typical coatings will typically be less that 1 µm thick. It will be appreciated by those skilled in the art that other methods of applying reactive monomer to form the polymer coating are readily apparent such as placing particles in a substantially uncured amount of reactive monomer.

A more hydrophobic layer on the surface of the metal powder yields better protection against environmental contaminants when stored and premature reaction where formulated in a solder paste, for instance.

The invention will be described now with reference to the following non-limiting Example(s).

EXAMPLES

Example A

Synthesis of Latent Organic Acid

Several polybutadiene and maleic anhydride adducts were synthesized with different maleic anhydride contents range from 5% to 0.1% by weight, and were evaluated. The synthesis is described below and is shown in FIG. 1.

The synthesis procedure is:
200 g of polybutadiene (MW 3400) and maleic anhydride (1.0 g) were dissolved into 250 ml of toluene, this mixture was transferred into a pressure parr tomb and was heated to 220-250° C. on a hot-plate. This enclosed system was allowed to stand at this temperature for a period of time of about 3-4 hours and then allowed to cool to room temperature. The reaction mixture was diluted with 2 L of toluene and passed thorough a glass funnel with a thin layer of silica gel to remove the residual unreacted maleic anhydride. The solvent was then removed by rotary evaporation to give the product, a viscous yellow liquid.

Example B

Commerically Available Latent Organic Acid

Polyethylene-co-maleic anhydride commercially available from Aldrich, shown below, was also evaluated.

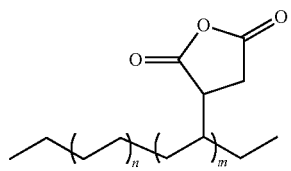

The weight percent of maleic anhydride ranges from 5% down to 0.1%.

Example 1

Organic Acid Coating Process 500 g of Type 4 solder powder (Tin, Cu and Ag alloy) (average size of 30 urn) was placed into a 2 L size round bottom flask along with 1 L of anhydrous xylene 0.2 g of polyethylene-co-maleic anhydride was then introduced and the flask was placed on a rotary evaporator, heated up to 60° C. and rotating the flask at 100 rpm to allow uniform mixing. After a period of time of 30 minutes, the reaction mixture was filtered to remove the solvent and the solder powder was rinsed twice with fresh xylene to remove any residual coating polymer that did not attached directly on the solder powder. The coated solder powder was allowed to dry at room temperature.

Example 2

Formulation of Solder Pastes

Coated solder powders (Type 4; Tin, Cu and Ag alloy), some of which are similar to those described in Example 1, were combined with flux and other solder paste components to form solder pastes.

The performance of the solder paste, after shelf life, storage life was tested by two methods, a description of each of which follows below:
1. Solder balling test
2. Viscosity test Solder Balling Test The solder paste is printed through a stainless steel stencil onto a glass slide which is then reflowed and examined for evidence of solder balls.
1. Using a razor blade as a squeegee, print the paste onto a glass slide using a stencil. Stencil is 0.1 mm thick with 3 holes of approximately 5 mm diameter with even spacing along the stencil.
2. Heat the glass slide on solder bath at 250° C. for 5 seconds or until it reflows.
3. Remove the slide from the bath and roll main ball off the slide before allowing it to cool.
4. Assess the slide on a binocular microscope at magnification×10, by counting the number of solder balls on each print.

5. Take the average of the lower two prints and compare to the table below.

| Observation | Assessment |
| --- | --- |
| 0-10 small balls | Pass |
| >10 small balls | Fail |

Viscosity Test

Brookfield viscometers employ the principle of rotational viscometry: the viscosity is measured by sensing the torque required to rotate a T bar spindle at constant speed while immersed in the sample. The torque is proportional to the viscous drag on the immersed spindle, and thus to the viscosity of the paste. The test is carried out at specific temperature on solder paste that has been prepared in a prescribed manner.
1. Place sample at 25° C. for 6 hours.
2. After 6 hours, remove sample from 25° C., open and remove internal plunger. Scrape any paste adhering to plunger and add to sample.
3. Using spatula, stir paste gently for 30 seconds taking care to avoid the introduction of air.
4. Use Brookfield viscometer RVDV-II+ on helipath stand with TF spindle attached. Set rotation speed to 5 rpm.
5. Set bottom of helipath travel 40 mm below surface of paste. Set spindle 3 mm below surface of paste.
6. Start spindle rotation and helipath stand descent.
7. Record viscosity at lowest point of descent.

What is claimed is:

1. Solder particles having a polyalkylene polymer with organic acid or latent organic acid functional groups coated on at least a portion of the surface thereof, wherein the solder particles are made from an alloy selected from the group consisting of tin/silver/copper, tin/zinc, tin/bismuth, tin/lead, and tin/indium/bismuth and wherein the solder particles have a varied size distribution of diameters of about 0.5 to about 100 µm, wherein the polyalkylene is selected from the group consisting of polyethylene, polypropylene, polybutylene and mixtures thereof.

2. A solder paste composition comprising the coated solder particles according to claim 1 and flux.

3. The solder paste composition claim 2 wherein the coated solder particles are present in amount of from about 10 to about 98% by weight with respect to the total component.

4. The solder particles of claim 1 wherein the organic acid or latent organic acid functional groups is selected from maleic anhydride, dimmer acids, steric acid, adipic acid, 12-hydrosteric acid or mixtures thereof.

5. The solder particles of claim 1 wherein the varied distribution of diameters is from about 3 to about 50 µm.

6. The solder particles of claim 1, wherein the polymer has organic acid functional groups, and wherein the organic acid is a carboxylic acid.

7. Solder particles having a polyalkylene polymer with organic acid or latent organic acid functional groups coated on at least a portion of the surface thereof, wherein the organic acid or latent organic acid coating on one or more of the solder particles is less than about 5 µm in thickness wherein the solder particles are made from an alloy selected from the group consisting of tin/silver/copper, tin/zinc, tin/bismuth, tin/lead, and tin/indium/bismuth and wherein the solder particles have a varied size distribution of diameters of about 0.5 to about 100 µm, wherein the polyalkylene is selected from the group consisting of polyethylene, polypropylene, polybutylene and mixtures thereof.

8. The solder particles according to claim 7 wherein the organic acid or latent organic acid coating on one or more of the solder particles is in the range from about 0.0001 to about 3.0 µm in thickness.

9. The solder particles according to claim 7 wherein the organic acid or latent organic acid coating on one of more of the solder particles is in the range from about from 0.001 to about 1 µm in thickness.

* * * * *

UNITED STATES PATENT AND TRADEMARK OFFICE
CERTIFICATE OF CORRECTION

PATENT NO. : 9,682,447 B2  
APPLICATION NO. : 12/860497  
DATED : June 20, 2017  
INVENTOR(S) : Puwei Liu Page 1 of 1

It is certified that error appears in the above-identified patent and that said Letters Patent is hereby corrected as shown below:

Column 6, Line 10: Change "Commerically" to -- Commercially --.

Column 8, Line 35: In Claim 9 Change "one of more" to -- one or more --.

Signed and Sealed this
Fourteenth Day of August, 2018

Andrei Iancu
*Director of the United States Patent and Trademark Office*